US012283801B2

(12) United States Patent
Thoren et al.

(10) Patent No.: US 12,283,801 B2
(45) Date of Patent: Apr. 22, 2025

(54) COLLET FOR MULTIPLE WIRE ELEMENTS

(71) Applicant: BAE SYSTEMS Information and Electronic Systems Integration Inc., Nashua, NH (US)

(72) Inventors: Matthew D. Thoren, Pelham, NH (US); John C. Cobb, Plymouth, MA (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 4 days.

(21) Appl. No.: 18/340,632

(22) Filed: Jun. 23, 2023

(65) Prior Publication Data

US 2024/0429690 A1 Dec. 26, 2024

(51) Int. Cl.
*H02G 3/04* (2006.01)
*H02G 1/06* (2006.01)

(52) U.S. Cl.
CPC ............ *H02G 3/0437* (2013.01); *H02G 1/06* (2013.01)

(58) Field of Classification Search
CPC .... B25B 9/02; F16B 2/10; F16B 2/205; F16B 2/22; F16B 2/26; F16L 21/007; F16L 3/223; H02G 1/081; H02G 1/14; H02G 11/02; H02G 15/10; H02G 15/18; H02G 3/32; H02K 15/02
See application file for complete search history.

(56) References Cited

U.S. PATENT DOCUMENTS

| 3,522,961 | A | * | 8/1970 | Cave, Sr. | ................ F16G 11/02 174/79 |
| 6,113,059 | A | * | 9/2000 | Couillard | ............... B65H 27/00 193/37 |
| 7,225,507 | B2 | * | 6/2007 | Anderson | ............. D06F 95/008 24/339 |
| 9,438,021 | B2 | * | 9/2016 | Crounse | ................... H02G 3/32 |
| 2014/0182085 | A1 | * | 7/2014 | Dodge | ...................... F16B 2/10 24/132 WL |

FOREIGN PATENT DOCUMENTS

EP 2 715 425 2/2017

* cited by examiner

*Primary Examiner* — Tyrone V Hall, Jr.
(74) *Attorney, Agent, or Firm* — Gary McFaline

(57) ABSTRACT

A collet for multiple wire elements is disclosed. In an example, the collet has a body made of a polymeric material and extends along a central axis from a first end to a second end. The body defines a first passageway extending axially through the body, the first passageway in communication with the environment via a first insertion opening extending along an entire length of the first passageway. The body defines a second passageway extending axially through the body and in communication with the environment along an entire length of the second passageway via a second insertion opening, the second passageway spaced circumferentially from the first passageway. When installed, the collet frictionally engages wire elements when a first wire element is seated in the first passageway and a second wire element is seated in the second passageway.

19 Claims, 5 Drawing Sheets

COLLET FOR MULTIPLE WIRE ELEMENTS

STATEMENT OF GOVERNMENT INTEREST

This invention was made with United States Government assistance under Contract No. N6523620C8015, awarded by DARPA. The United States Government has certain rights in this invention.

TECHNICAL FIELD

The present disclosure relates generally to devices for handling cable and wire elements, and more particularly to a collet constructed for use with multiple wire elements at the same time.

BACKGROUND

Wire, cable, and related elements can be stored on and deployed from a spool. To facilitate handling and installation, a cable collet (sometimes called a wire chuck) may be used. A collet includes a central passage sized to receive a wire element and a number of tapered collet segments arranged circumferentially around the central passage. A sleeve can be advanced over the collet segments to tighten the collet segments onto the wire element. In doing so, circumferential space between adjacent collet segments and radial space between individual collet segments and the wire are reduced, causing the collet segments to engage and collectively grip the wire element. Further advancing the sleeve can increase the frictional pressure or grip on the wire element.

Figure 1:
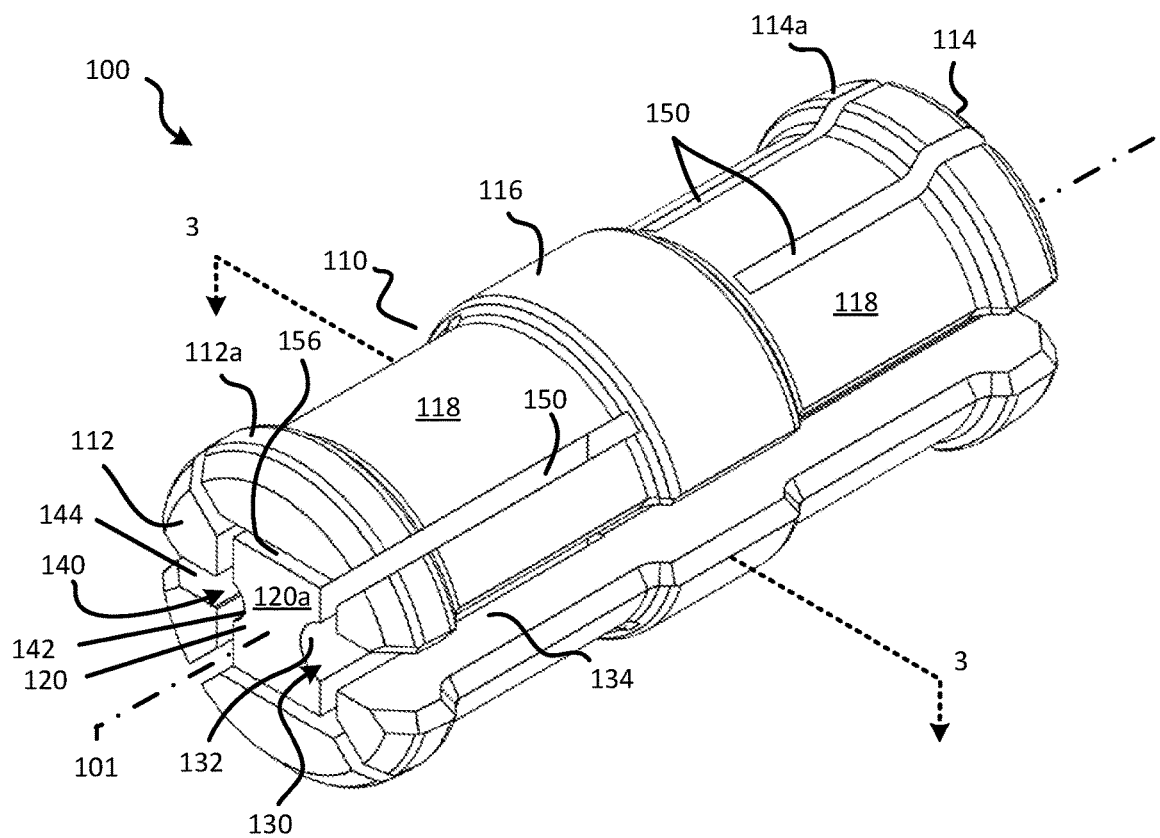
FIG. 1 is a first perspective view showing a collet configured for multiple wire elements, in accordance with an embodiment of the present disclosure.

The figures depict various embodiments of the present disclosure for purposes of illustration only. Numerous variations, configurations, and other embodiments will be apparent from the following detailed discussion.

DETAILED DESCRIPTION

Disclosed is a collet configured to frictionally engage multiple wire elements. In one example embodiment, the collet is made of a polymeric material and has a body that extends along a central axis from a first end to a second end. The body can generally have a cylindrical geometry, although other geometries may be used as well. The body defines a first passageway extending axially through the body and a second passageway extending axially through the body, where the first and second passageways are spaced apart from one another. Each passageway is in communication with the environment along an entire length of the collet via an insertion opening, such as a slot. The collet can be made so that each passageway is sized to accommodate a wire element, such as a copper wire as the first wire element (for the first passageway) and a polymer tether as the second wire element (for the second passageway). The collet is constructed to frictionally engage the wire elements, with a first wire element being seated in the first passageway and a second wire element being seated in the second passageway. End portions of the collet can include a core portion with finger-like protrusions that extend axially from a middle portion of the body and surround the core, where the finger-like protrusions are configured to yield to a wire element being inserted into the corresponding passageway to facilitate installing a wire element in that passageway.

In use, collets as disclosed herein can be installed at intervals along two or more wire elements that are intended to be deployed together. For example, collets can be installed on the wire elements every 2-3 meters, resulting in a wire element assembly that can be coiled onto a single cable spool and later deployed from the spool with reduced effort and time compared to existing methods.

General Overview

Spooled wire assemblies have a number of applications. For example, a wire antenna can be deployed from a spool together with a support cable, which can be on a second spool. Similarly, a fiber optic power and data transfer cable can be deployed to lighter-than-air units along with a support cable or wire. One possible spooling technique may utilize two spools at the same time where the signal or electrical wire element is on a first spool and a structural support wire is on a second spool. The two wire elements can be deployed in tandem from their respective spools. In doing so, the wire elements are deployed a short distance at a time (e.g., 30 feet) and then stopped to allow workers to couple the two elements to one another using a crimp, cord, or cable tie, for example. However, some wire elements cannot be coupled to the wire support using electrically conductive material (or that becomes conductive at very high voltage), such as a metal crimp, due to the high voltage passing through the wire element. An additional challenge is that the deployment process is labor-intensive and time consuming because several workers are used to ensure that the two wire elements do not become tangled or misaligned as they are deployed. Deploying a test system, for example, may require multiple workers for many hours dedicated to such a deployment, only then to find out the system does not work and needs to be recalled.

The present disclosure addresses the foregoing challenges by providing a collet constructed to frictionally engage two or more wire elements at the same time. A collet according to the present disclosure may be installed without tools and requires relatively little to no specialized training. In some embodiments, the collet can be easily tailored and configured for a specific number of wires, can be made for use with wires of different sizes, and can be made of a variety of materials. The collet further can be made to provide a desired "grip" strength on each wire element by selecting the material properties and dimensions of the collet, in conjunction with collet features. An individual collet on a wire assembly can be repaired or replaced in a relatively quick and easy manner. The present disclosure also provides a method of using the collet with multiple wire elements. In one such embodiment, the method applies to assembly and simultaneous deployment of an antenna and a tether.

The collet may be configured in a number of ways. In one example embodiment, the collet has a generally cylindrical body that defines two or more wire passageways extending axially through the body. Each passageway is open to the outside of the body so that a wire element can be pressed into the passageway through the side of the collet, for example. Each passageway is sized to frictionally engage a wire element, such as an antenna wire, a support tether, or an optical fiber. Passages can be of the same or different size as needed. The collet can be made by molding, additive manufacturing (e.g., 3D printing), or other suitable method. The collet can be made of non-conductive materials, such as thermoplastic polyurethane ("TPU"). An example of one such TPU is a 3D printing element sold by Fenner Precision Polymers of Lititz, Pennsylvania as NinjaTek Eel printing element, which is a material that can be 3D printed, has an elongation of 355%, a Shore A hardness of 90, and has a tensile strength of 12 MPa. Other materials may be used as well.

Collet Structure

Figure 2:
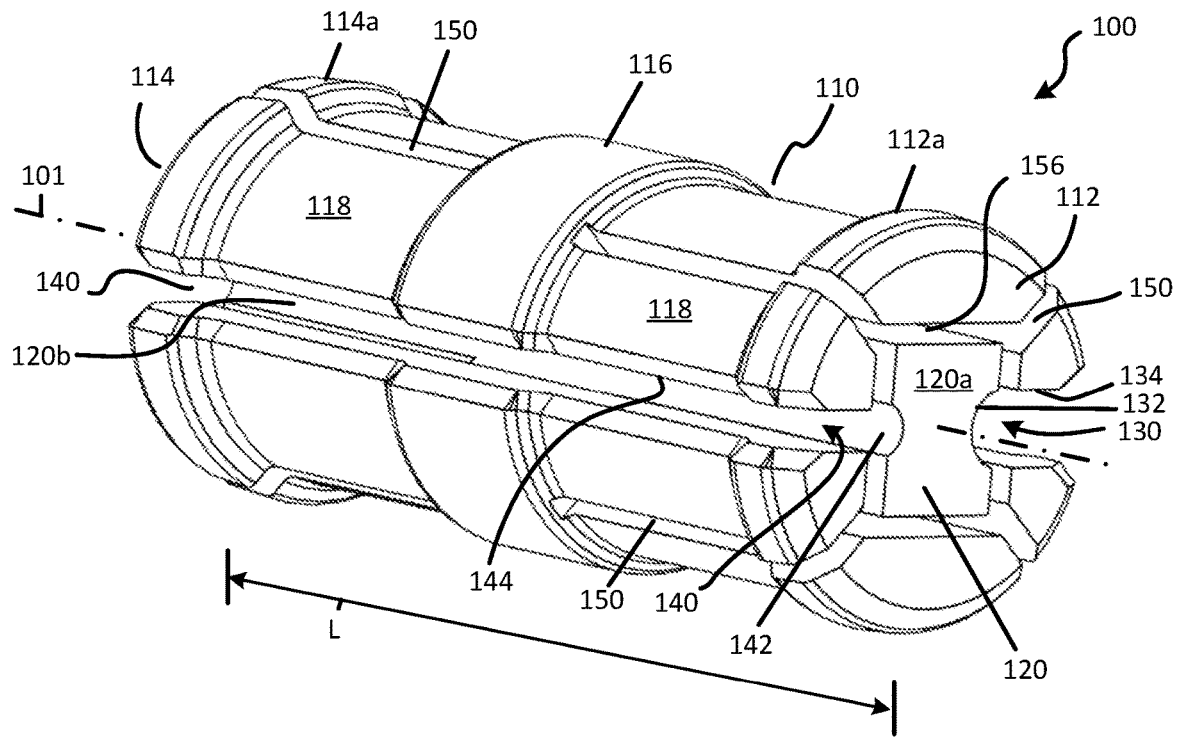
FIG. 2 is a second perspective view showing the collet of FIG. 1, in accordance with an embodiment of the present disclosure.

FIGS. 1 and 2 illustrate perspective views of a collet 100 in accordance with an embodiment of the present disclosure. The collet has a body 110 that extends along a central axis 101 from a first end 112 to a second end 114. The collet 100 defines a first passageway 130 and a second passageway 140, each of which extends axially through the body 110 and is configured to frictionally engage and receive a cylindrical wire element. The first and second passageways 130, 140 are open to the outside of the collet 100 via a respective insertion opening 134, 144 that is continuous with and extends outward from the respective first or second passageway 130, 140. For example, the insertion opening 134, 144 is a longitudinal slot along the length of the collet 100. Although the insertion opening 134, 144 is shown as extending radially outward from each passageway 130, 140, each insertion opening 134, 144 can extend in non-radial directions, such as at an angle of 30-45 degrees with respect to a true radial direction.

In this example, the body 110 has a generally cylindrical geometry that includes a middle portion 116, a first end portion 112a, and a second end portion 114a, each of which has a greater diameter than intermediate portions 118 between the first end portion 112a and the middle portion 116 and between the second end portion 114a and the middle portion 116. The difference in dimension (e.g., radius or diameter) enables the body 110 to better retain an optional securing device 170 (shown in FIG. 7), such as a band, a wire, a length of fabric or cord, a cable tie, or some other suitable device secured around an intermediate portion 118 of the body 110. Additionally, in some embodiments, the reduced diameter of the intermediate portions 118 requires less force to press a wire element into the passageway 130, 140 along that region, while the middle portion 116 has increased hoop strength that provides increased retention once the wire element is seated, owing to having an increased diameter. In this way, the user can get the wire element to seat initially in the passageway 130, 140 along the intermediate portion, followed by the wire element seating in the entire length L of the passageway 130, 140.

The first and second passageway 130, 140 each have a circular or ovoid cross-sectional shape that merges with the respective insertion opening 134, 144. The combination of the passageway and insertion opening can be a combination of a circle and an elongated rectangle that includes a radially inner curved portion 132, 142. For example, the combined cross-sectional shape can be a keyhole-like shape or similar shape. As such, the passageway 130, 140 and respective insertion opening 134, 144 are configured to frictionally engage a wire element around a majority portion of the wire element. In one example, the passageway 130 and portions of the body 110 along the insertion opening 134 function similar to a drill chuck that closes on and grips the wire element from three different sides.

In some embodiments, each passageway 130, 140 has a diameter that is equal to or less than that of the wire element to be retained. For example, the diameter of the passageway is from 80% to 100% of the diameter of the wire element to be retained, including 85%, 90%, 95%, 96%, 97%, 98%, and 99%. The ratio of passageway diameter to wire element diameter can be selected at least in part by the hardness of the material of the collet 100. In other embodiments, one or more passageway 130, 140 has a diameter that is greater than that of the wire element to be retained and is provided for easier insertion of the wire element. In some such embodiments, the passageway can be restricted around the wire element after installing the wire element in the passageway by using a strap or cable tie, for example, that is tightened around the body 110.

The first passageway 130 is spaced from the second passageway 140 by a central portion or core 120 of the body 110 that is defined by an annular channel 156 that extends axially into each end 112, 114 of the body 110. For example, the first passageway 130 is on an opposite side of the core 120 relative to the second passageway 140. Stated differently, the first passageway 130 is spaced circumferentially by 180° from the second passageway 140. In other embodiments, the first passageway 130 and second passageway 140 can be arranged around the core 120 and spaced circumferentially from one another by 60°, 90°, 120°, 135°, 150°, 180°, or some other amount. The core 120 is defined along the intermediate portions 118 and end portions 112a, 114a by the channel 156 that extends axially into the body 110 from each end portion 112a, 114a and circumscribes the core 120.

Figure 4:
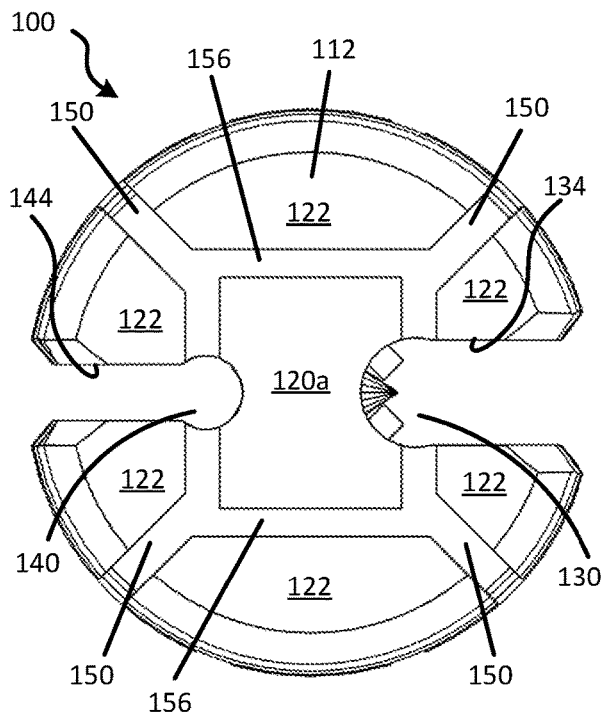
FIG. 4 is an end view of a collet showing a first end, in accordance with an embodiment of the present disclosure.
Figure 5:
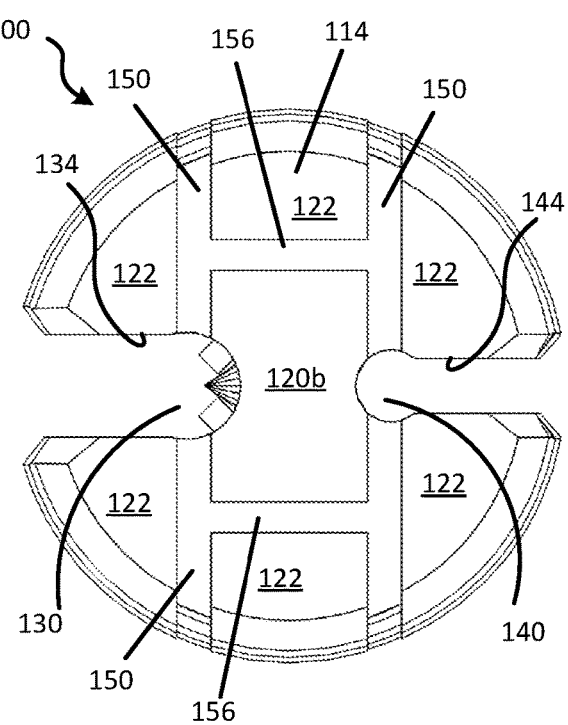
FIG. 5 is an end view of a collet showing a second end, in accordance with an embodiment of the present disclosure.

Although the core 120 is continuous with the middle portion 116 of the body 110, the core 120 is defined as a distinct part of the body 110 only along part of the axial length L of the collet 100. The core 120 includes a first core portion 120 defined along the end portion 112a and the adjacent intermediate portion 118, and a second core portion 120b defined along the second end portion 114a and the adjacent intermediate portion 118 of the body 110. In this example, the core 120 has a rectangular or square cross-sectional shape, except where intersected or cut out by part of the first and/or second passageway 130, 140. Note that the first core portion 120a can have a different cross-sectional shape and/or size compared to the second core portion 120b. In this example, the core 120 includes a first core portion 120a having a substantially square cross-sectional shape along the first end portion 112a and a second core portion 120b having a rectangular cross-sectional shape along the second end portion 114a, such as shown in FIGS. 4-5. The channel 156 defining each part of the 120 can be axially longer or shorter than shown.

In this example, the channel 156 and slits 150 have the same axial length, each extending axially to the middle portion 116 of the body 110. In other embodiments the slits 150 and/or channel 156 may have varied axial lengths and/or axial stopping points.

In embodiments having more than two passageways, for example, the passageways can be distributed equally or unequally about the core 120. In some embodiments, part of the passageway 130, 140 is defined in the core 120. Thus, when a wire element (e.g., a cable, antenna, or optical fiber) is installed in the first or second passageway 130, 140, the collet's position on the wire element is maintained in part by frictional engagement with the core 120. In one such embodiment, the collet 100 has three passageways spaced circumferentially by 120° from an adjacent passageway. In another embodiment, the collet 100 has three passageways including a first passageway spaced circumferentially 90° from a second passageway and 180° from a third passageway. In yet other embodiments, the collet 100 includes four, five, six, or some other number of passageways. Numerous variations and embodiments will be apparent in light of the present disclosure.

In addition to the passageways 130, 140 and associated insertion openings 134, 144, the collet 100 optionally defines one or more slits 150 that extend in a radial direction towards the core 120 and intersect the channel 156 defining the core 120. The slits 105 extend in an axial direction part way into the body 110 from each of the first end 112 and second end 114. The slits 150 divide the radially outer portion of the body 110 that surrounds the core 120 into finger-like projections 122 that extend axially from the middle portion 116. Due to the space provided by the slits 150 and channel 156 defining the core 120, the finger-like projections 122 can yield to a wire element being inserted into the passageway 130, 140, thereby facilitating seating the wire element in the passageway 130, 140. In this example, the collet 100 defines slits 150 in each of the first end portion 112a and second end portion 114a of the body 110. In this example, the slits 150 in the first end portion 112a are arranged and oriented differently that the slits 150 in the second end portion 114a, such as shown in the Figures, although this is not required in all embodiments.

Figure 3:
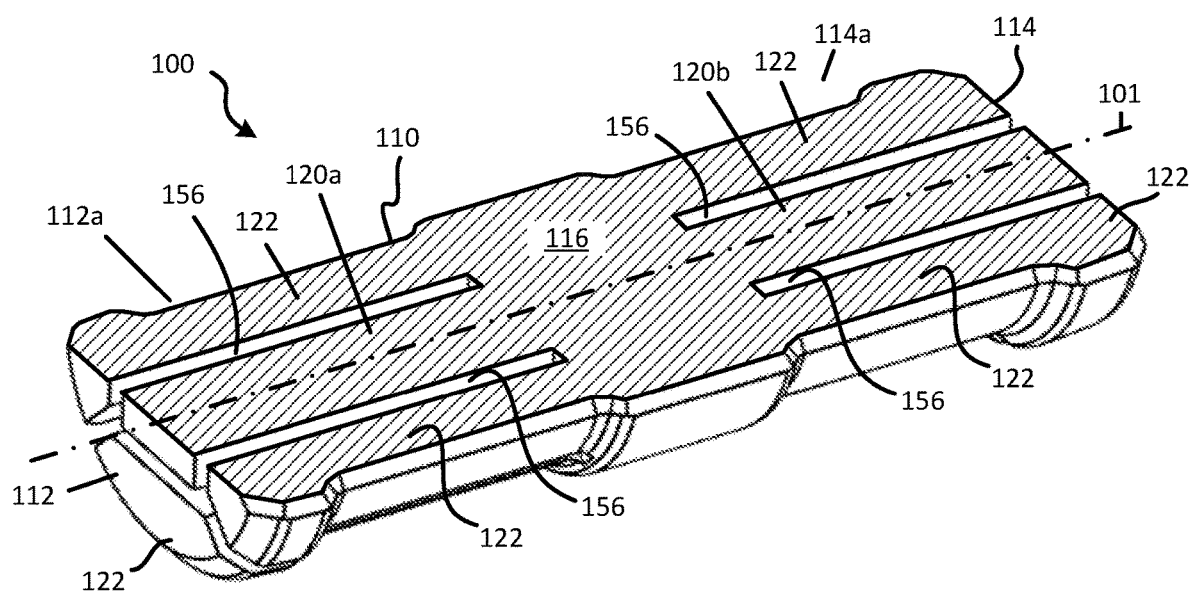
FIG. 3 is a cross-sectional view of a collet as viewed along line 3-3 of FIG. 1, in accordance with an embodiment of the present disclosure.

FIG. 3 illustrates a perspective view showing a cross section of the collet 100 as viewed along line 3-3 of FIG. 1. The first core portion 120a is defined along first end portion 112a and the second core portion 120b is defined along second end portion 114a by channels 156. The first and second core portions 120a, 120b extend to and joins with the middle portion 116 in a unitary structure. As a result of the slits 150 and channels 156, the first end portion 112a and second end portion 114a include a plurality of finger-like projections 122 that extend axially away from the middle portion 116, where the finger-like projections 122 surround the core 120.

FIGS. 4 and 5 illustrate end views of a collet 100, in accordance with another embodiment of the present disclosure. In FIG. 4, slits 150 extend into the body 110 through the first end 112 and are oriented in a radial direction toward corners of the core 120. These slits 150 intersect the channel 156 around the first core portion 120a and are spaced circumferentially in 90° intervals. Thus, the body 110 includes core 120 and finger-like projections 122 positioned radially outside of the core 122, where the finger-like projections 122 are circumferentially spaced from one another by slits 150 and are radially spaced from the core 120 by channel 156. Insertion openings 134, 144 are located between adjacent slits 150 (e.g., spaced 45° from an adjacent slit 150).

In FIG. 5, in contrast, slits 150 that extend through the second end 114 are oriented along parallel lines that align with and coincide with opposite sides of the channel 156 around the second core portion 120b. The slits 150 in the second end portion 114 therefore extend into the body 110 in a direction that is parallel to a radial direction. In this example, the slits 150 in the second end portion 114a coincide with part of the channel 156 defining the second core portion 120b. Finger-like projections 122 are circumferentially spaced from one another by slits 150 and are radially spaced from the second core portion 120b by channel 156.

Figure 6:
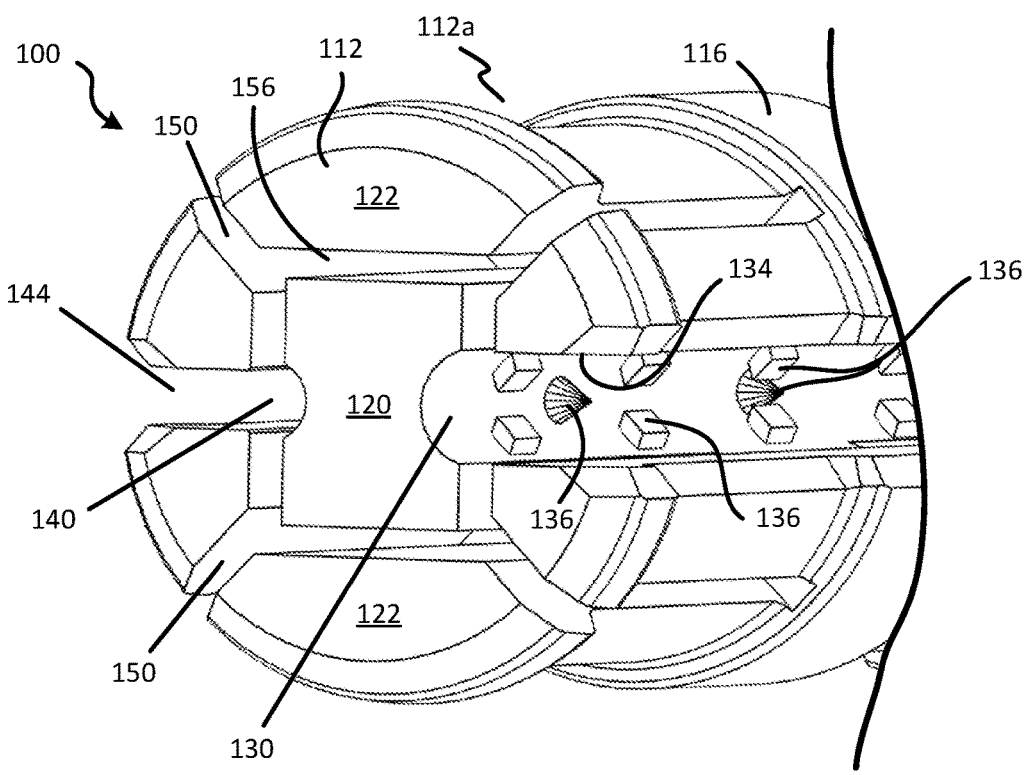
FIG. 6 is a perspective view showing a collet with grip-enhancing protrusions in a passageway of the collet, in accordance with an embodiment of the present disclosure.

FIG. 6 illustrates a perspective view of first end portion 112a of a collet 100, in accordance with an embodiment of the present disclosure. In this embodiment, the first passageway 130 includes a plurality of protrusions 136 that are configured to enhance frictional engagement with a wire element installed in the passageway. For example, the protrusions 136 can have a conical, cuboid, ovoid, linear, curved, or other suitable geometry. As shown in FIG. 6, the protrusions 136 include a mixture of cuboid or block-like protrusions 136 and conical or pointed protrusions 136. Due to the protrusions 136 defining a point, edge, corner, or combination of such features, the protrusions 136 tend to "bite" into or press into the surface of the wire element. For example, points on the conical protrusions 136 become lodged into the surface of the wire element, enhancing engagement. The protrusions 136 can be configured in terms of geometry, material hardness, position within the passageway, relative spacing, or a combination of these traits to enhance engagement with a particular material with which the collet 100 is intended to be used.

Figure 7:
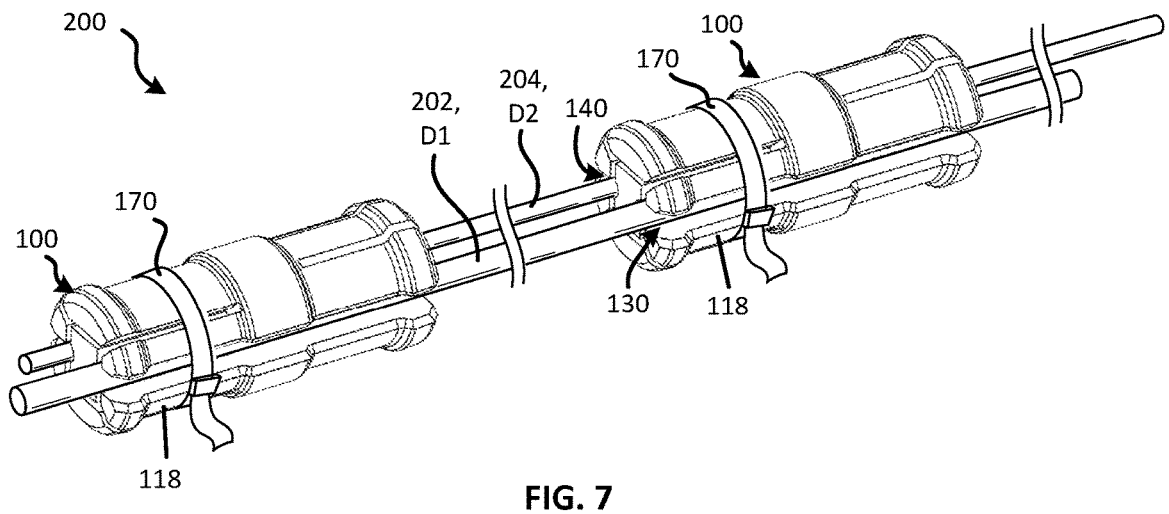
FIG. 7 is a perspective view showing a wire element assembly with first and second wire elements assembled with a plurality of collets, in accordance with an embodiment of the present disclosure.

Referring now to FIG. 7, a perspective view illustrates a wire element assembly 200, in accordance with an embodiment of the present disclosure. In this example, the wire element assembly 200 includes a first wire element 202 of a first diameter D1, a second wire element 204 of a second diameter D2, and a plurality of collets 100 installed on the first and second wire elements 202, 204 in a spaced-apart fashion. The first wire element 202 is received through the first passageway 130 of each collet 100 and the second wire element is received through the second passageway 140 of each collet 100. In this example, the first wire element 202 is a cable, tether, or structural support. The second wire element 204 can be an antenna, an optical fiber, or a wire or wire assembly configured for electricity and/or electrical signals, for example. In one example, the second wire element 204 is a braided cable, such as Litz wire.

The collets 100 are installed periodically along the first and second wire elements 202, 204 with spacing from 1 m to 5 m between adjacent collets. Other spacing can be used as deemed appropriate. At least some of the collets 100 are secured by a securing device 170 that encircles the intermediate portion 118 of the collet 100, such as a cable tie, strap, string, or a length of adhesive tape, for example.

Figure 8:
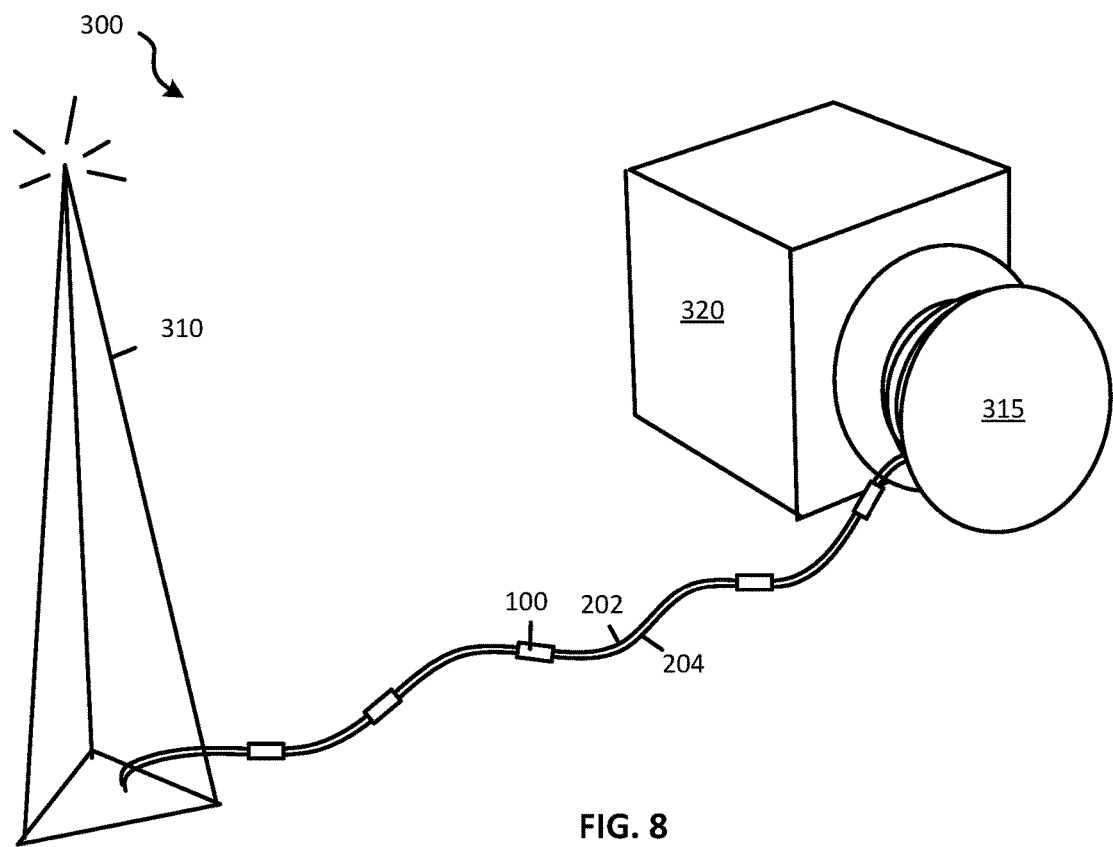
FIG. 8 illustrates a wire element assembly in use within the context of a system, in accordance with an embodiment of the present disclosure.

FIG. 8 illustrates an example system 300 for deploying a wire element, in accordance with an embodiment. In this example, the system 300 includes a communications structure 310, such as a telescoping pole or radio tower. In other embodiments, the communications structure 310 is a lighter-than-air unit, such as a communications balloon. First and second wire elements 202, 204 are assembled with a plurality of collets 100, such as shown in FIG. 7, and spooled on a cable spool 315 that is coupled to a winch 320. In one example, the winch is a gas-powered winch. The first and second wire elements 202, 204 can be deployed to the communications structure 310 using the winch 320.

Methodology

Figure 9:
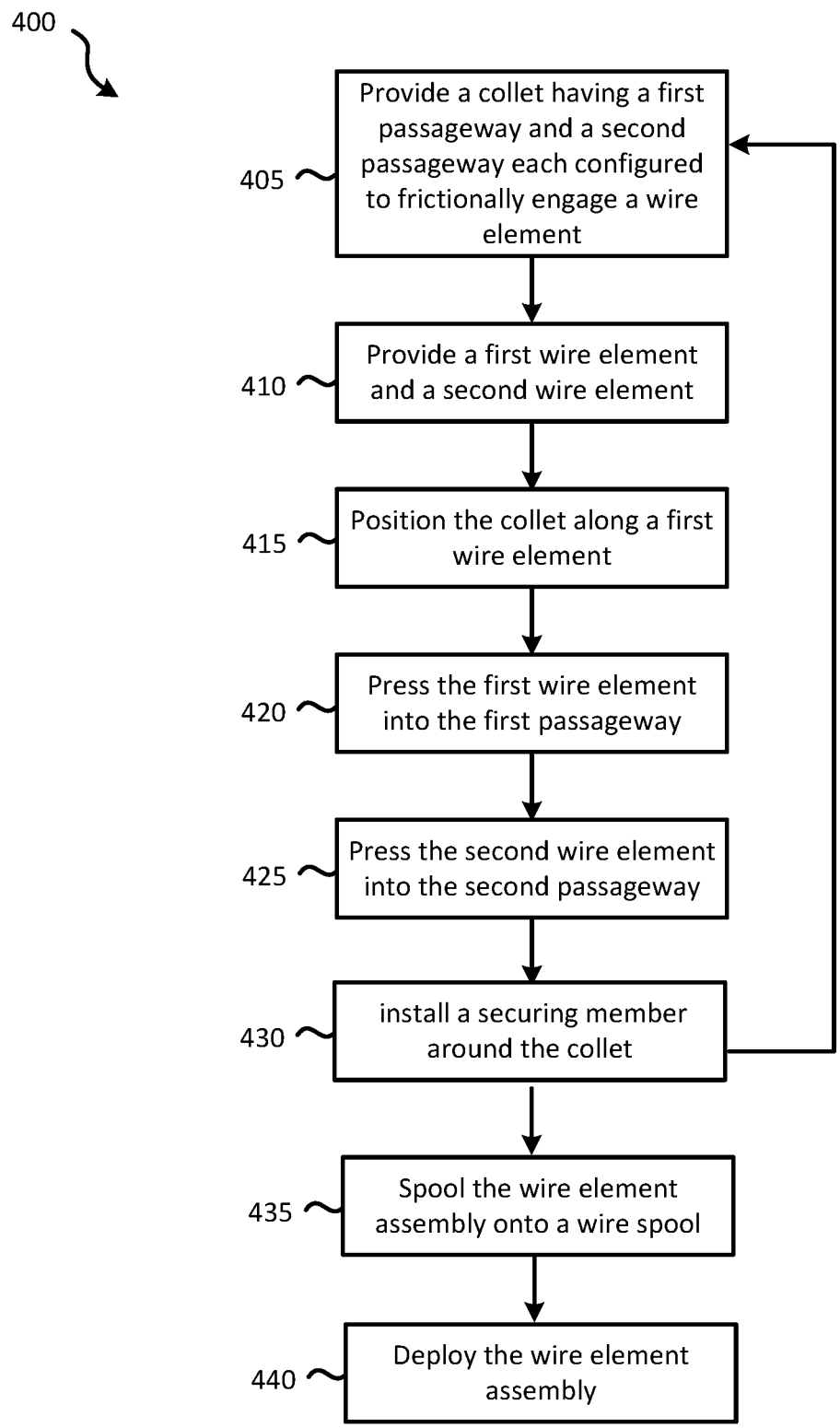
FIG. 9 is a flow chart for a method of deploying a wire element assembly, in accordance with some embodiments.

FIG. 9 illustrates a flow chart for a method 400 of deploying a wire element, in accordance with an embodiment of the present disclosure. Method 400 begins with providing 405 a collet having at least a first passageway and a second passageway configured to frictionally engage a wire element. The collet can be any of the embodiments of collet 100 discussed above.

Providing 405 the collet can include making the collet using additive manufacturing. For example, the collet can be 3D printed with a thermoplastic polyurethane (TPU). Printed TPU material can have an infill of 10% to 50% infill to provide a balance of hardness, conformity, and grip. In one embodiment, the printed TPU infill is from 15-20%. The collet can be made of other materials, such as rubber of various durometers, depending on the intended use. In one embodiment, the first and second passageways are formed with a diameter that is slightly smaller than the wire element to be installed therein. For example, the passageway diameter is 0.010" smaller (e.g., 1%-5% smaller) than the wire element to be installed, resulting in an interference fit with the wire element.

Method 400 also includes providing 410 a first wire element and a second wire element. For example, the first wire element is an antenna wire, an optical fiber, or other wire element used for signal processing and/or communications. The second wire element can be suitable to provide structural support to the first wire element, such as a cable or rope guide wire made of ultra-high molecular weight polyethylene made with elongated and aligned fibers. In some embodiments, the second wire element is an electrical insulator. One such material is marketed by Avient as Dyneema® fiber. In some embodiments, the first and second wire elements have a length of at least 500 meters, including at least 750 meters, at least 1000 meters, and at least 1200 meters.

Method 400 continues with positioning 415 the collet along the first and second wire elements. For each collet used, positioning 415 the collet can include spacing the collet from a previously installed collet, junction, or connector. In one embodiment, collets are positioned 415 with a spacing of from 1-5 meters from an adjacent collet.

Method 400 continues with pressing 420 the first wire element into the first passageway of the collet and pressing 425 the second wire element into the second passageway of the collet. As discussed above, pressing 420, 425 can be performed by first pressing the wire element into the passageway along an end portion of the collet, followed by pressing the wire element into the passageway along the middle portion of the collet.

Method 400 may continue with securing 430 the collet to the first and second wire elements by installing a securing device, such as a cable tie, strap, string, length of adhesive tape, or some other device. In another example, such installing may be skipped. The actions of 405-430 can be repeated for each of a plurality of collets to result in assembly of a wire element assembly that includes first and second wire elements with collets installed in a spaced-apart arrangement along the length of the wire elements.

In some embodiments, method 400 also includes spooling 435 the wire element assembly onto a wire spool, such as for later deployment. Method 400 also may include deploying 440 the wire element assembly from a wire spool for use. Deploying 440 the wire element assembly can be performed by unspooling the wire element assembly using a gas-powered winch.

Note that the processes in method 400 are shown in a particular order for ease of description. However, one or more of the processes may be performed in a different order or may not be performed at all (and thus be optional), in accordance with some embodiments. In one embodiment, for example, installing 430 a securing member is not performed for some or all collets. Numerous variations on method 400 and the techniques described herein will be apparent in light of this disclosure.

Further Example Embodiments

The following examples pertain to further embodiments, from which numerous permutations and configurations will be apparent.

Example 1 is a collet comprising a body extending along a central axis from a first end to a second end, the body made of a polymeric material. The body defines a first passageway and a second passageway, the first passageway extending axially through the body and in communication with the environment via a first insertion opening extending along an entire length of the first passageway. The second passageway extends axially through the body and communicates with the environment along an entire length of the second passageway via a second insertion opening. The second passageway is spaced circumferentially from the first passageway.

Example 2 includes the collet of Example 1, where the body defines a first end portion, a second end portion, and an intermediate portion. The first end portion and the second end portion each has a greater diameter than the intermediate portion.

Example 3 includes the collet of Example 2, where the body further defines a middle portion of greater diameter than the intermediate portion, where the middle portion divides the intermediate portion into a first intermediate portion and a second intermediate portion, the first intermediate portion is between the first end portion and the middle portion, and the second intermediate portion is between the second end portion and the middle portion.

Example 4 includes the collet of Example 3, where the middle portion has a larger diameter than the first end portion and the second end portion.

Example 5 includes the collet of any one of Examples 1-4, where the body defines a core that includes a first core portion defined by a first annular channel extending axially part way into the body through the first end. A second core portion is defined by a second annular channel extending axially part way into the body through the second end.

Example 6 includes the collet of Example 5, where the first annular channel has a first rectangular geometry.

Example 7 includes the collet of Example 6, where the second annular channel has a second rectangular geometry different from the first rectangular geometry.

Example 8 includes the collet of any one of Examples 5-7, where the first passageway is on a first side of the core and the second passageway on an opposite second size of the core.

Example 9 includes the collet of any one of Examples 5-8, where the first passageway and/or the second passageway is defined in part by the core.

Example 10 includes the collet of any one of Examples 5-9, where the body includes a middle portion of greater diameter, and where the first annular channel and the second annular channel extend toward but not into the middle portion.

Example 11 includes the collet of Example 10, where the body defines one or more first slits extending axially into the body through the first end and part way along a length of the body, and where the body defines one or more second slits extending axially into the body through the second end part way along the length of the body. The one or more first slits intersect the first annular channel and the one or more second slits intersect the second annular channel.

Example 12 includes the collet of Example 11, where each of the one or more first slits is coplanar with a side of the first annular channel.

Example 13 includes the collet of Example 11 or 12, where each slit of the one or more second slits extends to a corner of the second annular channel.

Example 14 includes the collet of any one of Examples 1-13, where the body has a cylindrical shape.

Example 15 includes the collet of any one of Examples 1-14, where the first passageway has a first size, and the second passageway has a second size different from the first size.

Example 16 includes the collet of any one of Examples 1-15, where the first passageway includes a plurality of protrusions configured to engage a surface of a wire element received in the first passageway.

Example 17 includes the collet of Example 16, where individual protrusions of the plurality of protrusions have a geometry selected from conical, cuboid, and ovoid.

Example 18 includes the collet of any one of Examples 1-17, wherein the polymeric material is a thermoplastic polyurethane.

Example 19 is a method of deploying a wire element assembly. In one embodiment, the method comprises providing a plurality of collets, individual collets made of a polymeric material and having a body extending along a central axis from a first end to a second end, wherein the body defines a first passageway extending axially through the body, the first passageway in communication with the environment via a first insertion opening extending along an entire length of the first passageway, and wherein the body defines a second passageway extending axially through the body and in communication with the environment along an entire length of the second passageway via a second insertion opening, the second passageway spaced circumferentially from the first passageway; providing a first wire element having a length of at least 500 meters; providing a second wire element having the length of at least 500 meters; installing the plurality of collets in a spaced-apart arrangement on the first wire element and the second wire element to provide a wire element assembly, wherein the first wire is element seated in the first passageway and the second wire element is seated in the second passageway; and spooling the wire element assembly on a cable spool.

Example 20 includes the method of Example 19 and further comprises deploying the wire element assembly from the cable spool.

Example 21 includes the method of Examples 19 or 20, where installing the plurality of collets includes spacing adjacent collets by a distance from 1-5 meters.

Example 22 includes the method of any one of Examples 19-21, where individual collets are made of a thermoplastic polyurethane.

Example 23 includes the method of any one of Examples 19-22, where the second wire element is made of ultra-high molecular weight polyethylene.

Example 24 includes the method of any one of Examples 19-23 and further comprises attaching a securing element around at least some of the collets of the plurality of collets.

Example 25 includes the method of any one of Examples 19-24, where the first conductor comprises an electrical conductor or an optical fiber.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future-filed applications claiming priority to this application may claim the disclosed subject matter in a different manner and generally may include any set of one or more limitations as variously disclosed or otherwise demonstrated herein.

What is claimed is:

1. A collet comprising:
    a body extending along a central axis from a first end to a second end, the body made of a polymeric material, wherein the body defines a first passageway and a second passageway, the first passageway extending axially through the body and in communication with the environment via a first insertion opening extending along an entire length of the first passageway, and the second passageway extending axially through the body and in communication with the environment along an entire length of the second passageway via a second insertion opening, the second passageway spaced circumferentially from the first passageway; and
    wherein the body defines a core that includes: a first core portion defined by a first annular channel extending axially part way into the body through the first end; and a second core portion defined by a second annular channel extending axially part way into the body through the second end.

2. The collet of claim 1, wherein the body defines a first end portion, a second end portion, and an intermediate portion, wherein the first end portion and the second end portion each has a greater diameter than the intermediate portion.

3. The collet of claim 2, wherein the body further defines a middle portion of greater diameter than the intermediate portion, wherein the middle portion divides the intermediate portion into a first intermediate portion and a second intermediate portion, the first intermediate portion is between the first end portion and the middle portion, and the second intermediate portion is between the second end portion and the middle portion.

4. The collet of claim 3, wherein the middle portion has a larger diameter than the first end portion and the second end portion.

5. The collet of claim 1, wherein the first annular channel has a first rectangular geometry and the second annular channel has a second rectangular geometry different from the first rectangular geometry.

6. The collet of claim 1, wherein the first passageway is on a first side of the core and the second passageway on an opposite second size of the core.

7. The collet of claim 1, wherein the first passageway and/or the second passageway is defined in part by the core.

8. The collet of claim 1, wherein the body includes a middle portion of greater diameter, and wherein the first annular channel and the second annular channel extend toward but not into the middle portion.

9. The collet of claim 8, wherein the body defines one or more first slits extending axially into the body through the first end and part way along a length of the body, and wherein the body defines one or more second slits extending axially into the body through the second end part way along the length of the body, wherein the one or more first slits intersect the first annular channel and the one or more second slits intersect the second annular channel.

10. The collet of claim 9, wherein each of the one or more first slits is coplanar with a side of the first annular channel.

11. The collet of claim 9, wherein each of the one or more second slits extends to a corner of the second annular channel.

12. The collet of claim 1, wherein the body has a cylindrical shape.

13. The collet of claim 1, wherein the first passageway includes a plurality of protrusions configured to engage a surface of a wire element received in the first passageway.

14. The collet of claim 13, wherein individual protrusions of the plurality of protrusions have a geometry selected from conical, cuboid, and ovoid.

15. The collet of claim 1, wherein the polymeric material is a thermoplastic polyurethane.

16. A method of deploying a wire element assembly, the method comprising:

providing a plurality of collets, individual collets made of a polymeric material and having a body extending along a central axis from a first end to a second end, wherein the body defines a first passageway extending axially through the body, the first passageway in communication with the environment via a first insertion opening extending along an entire length of the first passageway;

wherein the body defines a second passageway extending axially through the body and in communication with the environment along an entire length of the second passageway via a second insertion opening, the second passageway spaced circumferentially from the first passageway; and wherein the body defines a core that includes: a first core portion defined by a first annular channel extending axially part way into the body through the first end; and a second core portion defined by a second annular channel extending axially part way into the body through the second end;

providing a first wire element having a length of at least 500 meters;

providing a second wire element having the length of at least 500 meters;

installing the plurality of collets in a spaced-apart arrangement on the first wire element and the second wire element to provide a wire element assembly, wherein the first wire is element seated in the first passageway and the second wire element is seated in the second passageway; and spooling the wire element assembly on a cable spool.

17. The method of claim 16, wherein installing the plurality of collets includes spacing adjacent collets by a distance from 1-5 meters.

18. The method of claim 16, further comprising attaching a securing element around at least some of the collets of the plurality of collets.

19. The method of claim 16, wherein the first conductor comprises an electrical conductor or an optical fiber.

* * * * *